United States Patent [19]

Epperly et al.

[11] Patent Number: 4,888,165

[45] Date of Patent: Dec. 19, 1989

[54] PROCESS FOR THE REDUCTION OF NITROGEN OXIDES IN AN EFFLUENT USING A HETEROCYCLIC HYDROCARBON

[75] Inventors: William R. Epperly, New Canaan; James C. Sullivan, Southport, both of Conn.

[73] Assignee: Fuel Tech, Inc., Stamford, Conn.

[21] Appl. No.: 230,736

[22] Filed: Aug. 10, 1988

Related U.S. Application Data

[63] Continuation of Ser. No. 25,493, Mar. 13, 1987, abandoned.

[51] Int. Cl.$^4$ .......................... C01B 21/00; B01J 8/00
[52] U.S. Cl. ..................................... 423/235; 423/239
[58] Field of Search .................... 423/235, 235 T, 239, 423/239 A

[56] References Cited

U.S. PATENT DOCUMENTS

| | | | |
|---|---|---|---|
| 4,208,376 | 6/1980 | Arand et al. | 423/235 |
| 4,325,924 | 4/1982 | Arand et al. | 423/235 |
| 4,350,669 | 9/1982 | Izumi et al. | 423/235 |

FOREIGN PATENT DOCUMENTS

| | | | |
|---|---|---|---|
| 2703882 | 4/1977 | Fed. Rep. of Germany | 423/235 |
| 53-30975 | 3/1978 | Japan . | |
| 53-79762 | 7/1978 | Japan | 423/239 |
| 52-42643 | 11/1978 | Japan . | |
| 53-130274 | 11/1978 | Japan | 423/239 |

*Primary Examiner*—Gregory A. Heller
*Attorney, Agent, or Firm*—St. Onge Steward Johnston & Reens

[57] ABSTRACT

A process is presented for the reduction of nitrogen oxides in the effluent from the combustion of a carbonaceous fuel. The process comprises injecting a treatment agent comprising a heterocyclic hydrocarbon having at least one cyclic oxygen into an effluent under conditions effective to reduce the concentration of nitrogen oxides in the effluent.

25 Claims, 2 Drawing Sheets

PROCESS FOR THE REDUCTION OF NITROGEN OXIDES IN AN EFFLUENT USING A HETEROCYCLIC HYDROCARBON

This is a continuation of co-pending application Ser. No. 025,493 filed on Mar. 13, 1987 now abandoned.

1. Technical Field The present invention relates to a process for the reduction of nitrogen oxides ($NO_x$) in the effluent, especially the oxygen-rich effluent, from the combustion of a carbonaceous fuel by injection of a treatment agent comprising a heterocyclic hydrocarbon having at least one cyclic oxygen into the effluent.

Carbonaceous fuels can be made to burn more completely, and with reduced emissions of carbon monoxide and unburned hydrocarbons, when the oxygen concentrations and air/fuel ratios employed are those which permit high flame temperatures. When fossil fuels are used to fire large utility boilers, temperatures above about 2000° F. and typically about 2200° F. to about 3000° F. are generated. Unfortunately, such high temperatures, as well as hot spots of higher temperatures, tend to cause the production of thermal $NO_x$, the temperatures being so high that free radicals of oxygen and nitrogen are formed and chemically combine as nitrogen oxides. Nitrogen oxides can form even in circulating fluidized bed boilers which operate at temperatures which typically range from 1300° F. to 1700° F.

Nitrogen oxides, especially $NO_2$, are troublesome pollutants which are found in the combustion effluent streams of boilers when fired as described above, and comprise a major irritant in smog. It is further believed that nitrogen oxides can undergo a process known as photo-chemical smog formation, through a series of reactions in the presence of sunlight and hydrocarbons. Moreover, nitrogen oxides comprise a major portion of acid rain.

Unfortunately, the temperatures within a utility or circulating fluidized bed boiler render most common methods of reducing $NO_x$ concentrations, such as effluent scrubbing or catalyst grids, either uneconomical, infeasible, or both.

2. Background Art

Various methods and compositions for reducing the $NO_x$ concentration in the effluent from the combustion of a carbonaceous fuel have been proposed. For instance, Arand et al, in U.S. Pat. No. 4,208,386, disclose a method for reducing $NO_x$ in combustion effluents by injecting urea, either as a solid powder or in solution, at effluent temperatures in excess of 1300° F. The preferred urea solutions are those having at least 10 weight percent urea. For operation at temperatures below 1600° F., the use of reducing materials such as paraffinic, olefinic, aromatic and oxygenated hydrocarbons, as well as hydrogen, are required.

Bowers, in copending and commonly assigned U.S. patent application Ser. No. 906,671, filed Sept. 10, 1986 now U.S. Pat. No. 4,737,065, discloses the use of a solution which comprises urea and hexamethylenetetramine (HMTA) to reduce the $NO_x$ concentration in oxygen-rich effluents having temperatures above 1300° F. Similarly, Bowers, in copending and commonly assigned U.S. patent application Ser. No. 784,828, filed Oct. 4, 1985 now U.S. Pat. No. 4,719,092, discloses a solution comprising urea and an oxygenated hydrocarbon solvent which is disclosed as being effective at reducing $NO_x$ concentrations with reduced ammonia slippage in effluents at temperatures above 1600° F.

In copending and commonly assigned U.S. patent application entitled "Process for Reducing Nitrogen Oxides in an Effluent Using a Hydrocarbon or Hydrogen Peroxide" having Ser. No. 022,776 filed Mar. 6, 1987, Sullivan discloses the use of hydrocarbons to reduce $NO_x$ levels in effluents at low temperatures (i.e., below 1450° F., especially below 1300° F.).

Although the prior art processes for reducing nitrogen oxides concentrations are generally effective, there exists a present need for a process which elicits still further $NO_x$ reductions in an economical and convenient manner.

DISCLOSURE OF INVENTION

The present invention relates to a process for reducing nitrogen oxides in the effluent from the combustion of a carbonaceous fuel. More particularly, the present invention relates to a process which comprises injecting into the effluent from the combustion of a carbonaceous fuel a treatment agent comprising a heterocyclic hydrocarbon having at least one cyclic oxygen under conditions effective to reduce the nitrogen oxides concentration in the effluent. Most preferably, the heterocyclic hydrocarbon comprises furfural.

BRIEF DESCRIPTION OF THE DRAWINGS

The present invention will be better understood and its advantages more apparent in view of the following detailed description, especially when read with reference to the appended drawings, wherein.

BEST MODE FOR CARRYING OUT THE INVENTION

Figure 1:
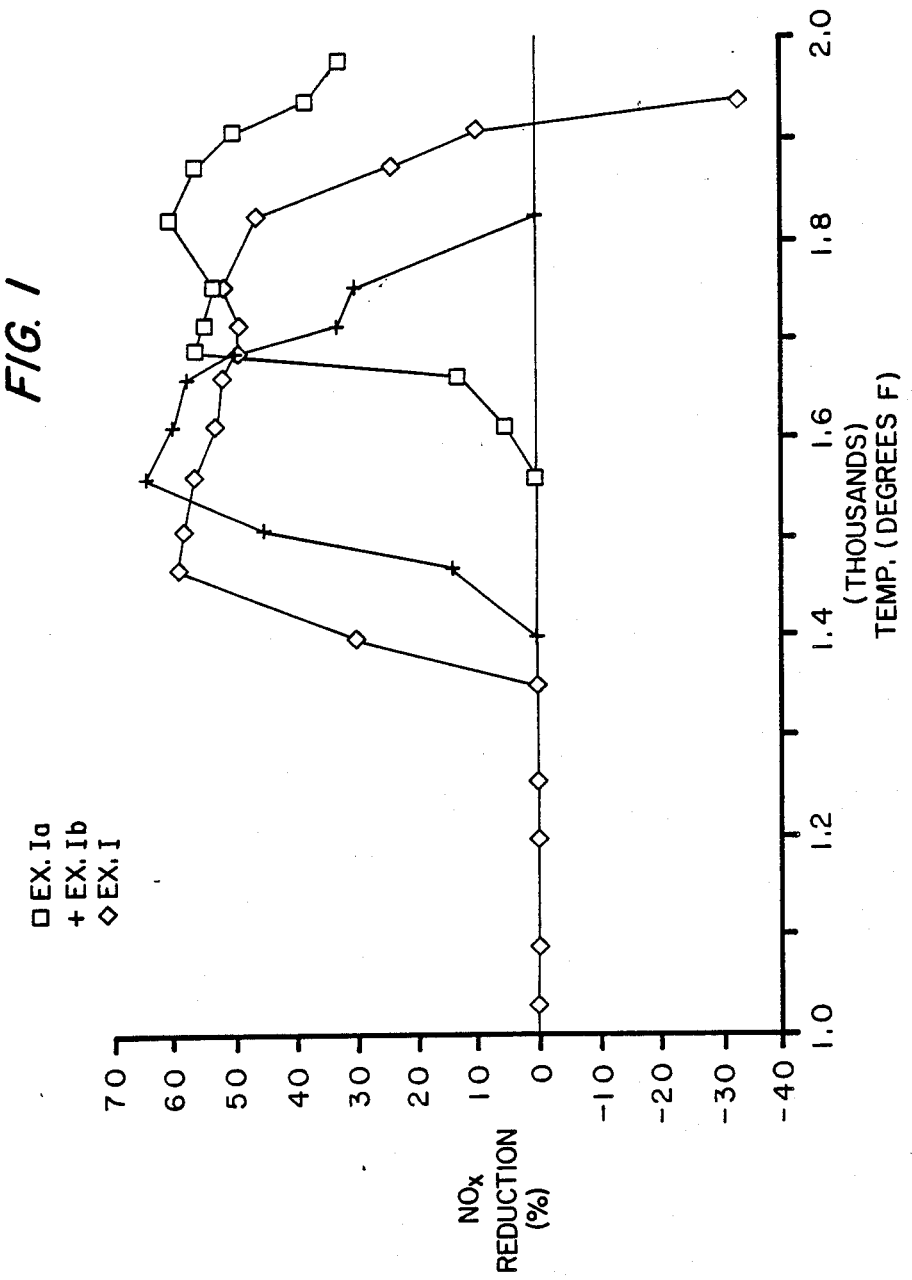
FIG. 1 is a graphic representation of the results of Example I, illustrating the broadened range of effectiveness with respect to temperature dependency elicited by use of the present invention.

As discussed above, the present invention relates to the reduction of nitrogen oxides in the effluent, especially the oxygen-rich effluent, from the combustion of a carbonaceous fuel using a treatment agent which comprises a heterocyclic hydrocarbon having at least one cyclic oxygen, preferably furfural.

For the purposes of this description, all temperatures herein are measured using an unshielded K-type thermocouple. Unless otherwise indicated, all parts and percentages are based on the weight of the composition at the particular point of reference.

The term "heterocyclic hydrocarbon having at least one cyclic oxygen" as used in this description refers to a ringed hydrocarbon compound having at least one ring oxygen. The term "furfural" as used in this description is meant to include furfural itself as well as substituted furfural. Typical substituents include side chains comprising straight and branched-chain, substituted and unsubstituted aliphatic groups, oxygenated hydrocarbon groups and amino groups. Preferred substituted furfural compounds include hydroxymethyl furfural and furfural acetone.

The treatment agent of this invention most preferably further comprises urea. The term "urea" as used in this description includes the compound urea itself, as well as compounds equivalent in effect. Thus, unless otherwise specified, reference in this disclosure to urea should not be taken as limiting to urea itself, but should extend to urea and all of its equivalents. It is pointed out that the term equivalent is not limited to exact equivalents, and various equivalents will be optimally operable at some conditions which are different than those for other equivalents. Moreover, some equivalents may be more effective than others.

Advantageously, the treatment agent of this invention is injected into the effluent in solution or as a dispersion or mixture in a suitable solvent. Water is a preferred solvent due to the economy of aqueous solutions, dispersions and mixtures and the fact that they can be employed with suitable effectiveness in most situations. For ease of description, the term "mixture" will be used to denote mixtures, dispersions and solutions. The effective mixture comprising the treatment agent of this invention will range from saturated to dilute. While water is an effective solvent for most applications, it will be recognized that there may be instances where other solvents may be advantageously used, either alone or in combination with water, as would be known to the skilled artisan.

The level of heterocyclic hydrocarbon present in the mixture is advantageously in the range of about 0.5% to about 25% by weight, preferably about 5% to about 15% by weight. Where urea is employed in the treatment agent, it should preferably be present in the mixture in the range of about 2% to about 60%, most preferably about 5% to about 30% by weight. The weight ratio of heterocyclic hydrocarbon to urea, when urea is used with the heterocyclic hydrocarbon as the treatment agent in mixture, should advantageously be about 1:10 to about 4:1, more preferably about 1:5 to about 3:1. The most preferred weight ratio of heterocyclic hydrocarbon to urea in the mixture is about 1:4 to about 2.5:1.

The temperature of the effluent at the point of injection will have an influence on the concentration of the mixture. At temperatures of about 1300° F. to about 1700° F., the mixture will tend to operate effectively at high concentration, e.g., about 10% to about 65% by weight treatment agent. On the other hand, at temperatures in excess of about 1700° F., the solution will tend more towards dilute. At these higher temperatures, water (or the solvent in case of non-aqueous solutions) may comprise greater than 80%, 85% or even 90% by weight of the solution.

The treatment agent of this invention is preferably injected into the effluent in an amount effective to elicit a reduction in the nitrogen oxides concentration in the effluent. Advantageously, the treatment agent of this invention is injected into the effluent in an amount sufficient to provide a molar ratio of the nitrogen contained in the treatment agent to the baseline nitrogen oxides level of about 1:5 to about 10:1. More preferably, the treatment agent is injected into the effluent to provide a molar ratio of treatment agent nitrogen to baseline nitrogen oxides level of about 1:3 to about 5:1, most preferably about 1:2 to about 3:1.

In situations where the treatment agent comprises urea as well as the heterocyclic hydrocarbon, the injection ratio can alternatively be expressed as the normalized stoichiometric ratio (NSR) of the treatment agent to the baseline nitrogen oxides level. Normalized stoichiometric ratio is the ratio of the concentration of $NH_x$ radicals ($NH_x$ radicals, with x being an integer, are believed to be the moiety contributed by urea which facilitates the series of reactions resulting in $NO_x$ breakdown) to the concentration of nitrogen oxides in the effluent and can be expressed as $[NH_x]/[NO_x]$.

The treatment agent, whether in a mixture or injected in pure form, is preferably injected into the effluent gas stream at a point where the effluent is at a temperature above about 1300° F., more preferably above about 1400° F. and most preferably above about 1450° F. Large industrial and circulating fluidized bed boilers of the types employed for utility power plants and other large facilities will typically have access only at limited points. In the most typical situations, the boiler interior in the area above the flame operates at temperatures which at full load approach 1900° F., even 2000° F. After subsequent heat exchange, the temperature will be lower, usually in the range between about 1300° F. and about 1900° F. At these temperatures, the treatment agent of this invention can be effectively introduced to accomplish substantial reduction of nitrogen oxides in the effluent.

The treatment agent utilized according to this invention is preferably injected at a number of spaced positions from nozzles or other apparatus which are effective to uniformly distribute the treatment agent through the combustion effluent.

The effluent into which the treatment agent of this invention is injected is preferably oxygen-rich, meaning that there is an excess of oxygen in the effluent. Advantageously, the excess of oxygen is greater than about 1% by volume. Most preferably, the excess of oxygen is in the range of about 1% to about 12% or greater by volume.

It will be understood that the $NO_x$ reducing treatment agents of this invention are useful not only where substantial nitrogen oxides reductions are accomplished by directly applying the disclosed method as the principal $NO_x$ reducing method, but can also be employed as a discrete step in combination with other chemical, catalytic or other procedures for reducing nitrogen oxides concentrations as well as other pollutants such as sulfur dioxide ($SO_2$), while preferably controlling levels of residual pollutants such as ammonia and/or carbon monoxide. Such a suitable "multi-step" process is disclosed in copending and commonly assigned U.S. patent application entitled "Multi-Stage Process for Reducing the Concentration of Pollutants in an Effluent" having Attorney's Docket Number 937-00671, filed in the names of Epperly, Peter-Hoblyn, Shulof and Sullivan on Mar. 6, 1987, the disclosure of which is incorporated herein by reference.

It is a surprising and advantageous result that the use of a heterocyclic hydrocarbon having at least one cyclic oxygen in the treatment agent of this invention will operate to increase the range of temperatures at which urea is found to be most effective at the reduction of $NO_x$ in an effluent. As illustrated in FIG. 1, urea, when used alone or in combination with a compound disclosed in the prior art as being an enhancer for urea, such as ethylene glycol, will reduce the effluent nitrogen oxides concentration in a temperature dependent manner, with the optimal $NO_x$-reduction within a relatively narrow range of temperatures. As also illustrated in FIG. 1, when furfural, the most preferred heterocyclic hydrocarbon having at least one cyclic oxygen according to this invention, is injected as a treatment agent along with urea, the $NO_x$ reduction curve is significantly broader with respect to temperature. This broadened reduction curve is extremely desirable in practical applications, because a commercial boiler is not always operated at the same load, and, even when operated at the same load over a period of time, temperature variations are not uncommon which would take the urea curve out of its optimal range if the heterocyclic hydrocarbon were not employed.

A further advantageous aspect of the practice of this invention is in the reduced production of other pollutants, such as ammonia and carbon monoxide, during the nitrogen oxides reduction process. The presence of ammonia in the effluent should be avoided because, among other reasons, it can react with $SO_3^=$ to form ammonium bisulfate which can foul heat exchange surfaces in a boiler. Moreover, ammonia has detrimental effects on ambient air quality, as has carbon monoxide. The reason for the lower levels of ammonia and carbon monoxide is not fully understood but is probably because the series of reactions involving the heterocyclic hydrocarbon, urea and $NO_x$ which lead to the reduction of $NO_x$ concentrations simply does not produce substantial amounts of other pollutants as byproducts.

The following examples further illustrate and explain the invention by detailing the operation of a treatment agent comprising a heterocyclic hydrocarbon having at least one cyclic oxygen in the reduction of nitrogen oxides emissions.

EXAMPLE I

The burner used is a burner having an effluent flue conduit, known as a combustion tunnel, approximately 209 inches in length and having an internal diameter of 8 inches and walls 2 inches thick. The burner has a flame area adjacent the effluent entry port and flue gas monitors adjacent the effluent exit port to measure the concentration of compositions such as nitrogen oxides, sulfur oxides, ammonia, carbon monoxide, carbon dioxide, percent excess oxygen and other compounds of interest which may be present in the effluent. The effluent flue conduit additionally has thermocouple ports for temperature measurement at various locations. The temperature of the effluent into which the treatment agents are injected is measured at the point of injection utilizing a K-type thermocouple. Atomizing injectors described in copending and commonly assigned U.S. patent application entitled "Process and Apparatus for Reducing the Concentration of Pollutants in an Effluent" having Ser. No. 009,696, filed in the name of Burton on Feb. 2, 1987, the disclosure of which is incorporated herein by reference, are positioned through ports in the effluent flue conduit in order to introduce and distribute the treatment agents into the effluent stream. The agents are injected into the effluent at a rate of 300 ml/hr. The burner fuel is a Number 2 fuel oil, and the burner is fired at a rate of 9.6 lbs/hr to 12.0 lbs/hr.

A baseline nitrogen oxides concentration reading is taken prior to beginning each run to calculate the injection ratio of treatment agent to baseline nitrogen oxides and the NSR, and a final nitrogen oxides reading is taken during and downstream from injection of the treatment agents to calculate the reduction in the nitrogen oxides concentration in the effluent elicited by each of the treatment agents injected.

The treatment agent injected is an aqueous solution which comprises 10% by weight of urea, 15% by weight of furfural, and 0.1% by weight of a commercially available surfactant. The injection temperature, % excess oxygen, NSR, baseline $NO_x$, final $NO_x$ and % reduction of $NO_x$ for each run is set out in Table 1 and reproduced graphically in FIG. 1.

TABLE 1

| Run | Temp. °F. | $O_2$ % | NSR | $NO_x$ (ppm) Baseline | Final | % Red. |
|---|---|---|---|---|---|---|
| 1 | 1400 | 3.1 | 1.83 | 195 | 137 | 29.7 |
| 2 | 1470 | 3.0 | 1.73 | 208 | 85 | 59.1 |
| 3 | 1510 | 3.0 | 2.11 | 170 | 71 | 58.2 |
| 4 | 1565 | 3.0 | 2.11 | 170 | 74 | 56.5 |
| 5 | 1615 | 3.0 | 2.11 | 170 | 80 | 52.9 |
| 6 | 1665 | 3.0 | 2.11 | 170 | 82 | 51.8 |
| 7 | 1690 | 3.0 | 2.11 | 170 | 86 | 49.4 |
| 8 | 1715 | 3.0 | 2.08 | 173 | 88 | 49.1 |
| 9 | 1755 | 3.1 | 2.06 | 145 | 70 | 51.7 |
| 10 | 1825 | 3.1 | 2.06 | 145 | 78 | 46.2 |
| 11 | 1875 | 3.0 | 2.07 | 145 | 110 | 24.1 |
| 12 | 1910 | 3.0 | 1.97 | 152 | 137 | 9.9 |
| 13 | 1940 | 3.0 | 1.97 | 152 | 203 | −33.6 |

EXAMPLE Ia

The procedure of Example I is repeated except that the treatment agent which is injected is an aqueous solution comprising 10% by weight of urea and 0.1% by weight of a commercially available surfactant. The results are set out in Table 1a and reproduced graphically in FIG. 1.

TABLE 1a

| Run | Temp. °F. | $O_2$ % | NSR | $NO_x$ (ppm) Baseline | Final | % Red. |
|---|---|---|---|---|---|---|
| 1 | 1660 | 3.2 | 2.22 | 166 | 145 | 12.7 |
| 2 | 1695 | 3.0 | 1.54 | 167 | 73 | 56.3 |
| 3 | 1750 | 3.0 | 1.92 | 150 | 70 | 53.3 |
| 4 | 1800 | 3.0 | 1.89 | 152 | 60 | 60.5 |
| 5 | 1850 | 3.0 | 1.85 | 155 | 68 | 56.1 |
| 6 | 1950 | 3.0 | 1.85 | 155 | 96 | 38.1 |
| 7 | 1980 | 3.0 | 1.81 | 159 | 107 | 32.7 |

EXAMPLE Ib

The procedure of Example I is repeated except that the treatment agent injected is an aqueous solution comprising 10% urea by weight, 15% ethylene glycol (disclosed as being an enhancer for urea in copending and commonly assigned U.S. patent application having Ser. No. 784,828, filed on Oct. 4, 1985, the disclosure of which is incorporated herein by reference) by weight and 0.1% of a commercially available surfactant. The results are set out in Table 1b and reproduced graphically in FIG. 1.

TABLE 1b

| Run | Temp. °F. | $O_2$ % | NSR | $NO_x$ (ppm) Baseline | Final | % Red. |
|---|---|---|---|---|---|---|
| 1 | 1450 | 7.0 | 1.69 | 145 | 125 | 13.8 |
| 2 | 1515 | 3.1 | 1.76 | 178 | 98 | 44.9 |
| 3 | 1555 | 3.2 | 1.79 | 174 | 62 | 64.4 |
| 4 | 1650 | 3.0 | 1.91 | 165 | 70 | 57.6 |
| 5 | 1710 | 3.0 | 1.53 | 167 | 85 | 49.1 |
| 6 | 1720 | 3.0 | 1.45 | 167 | 112 | 32.9 |

It is clear from Tables 1, 1a and 1b, as well as FIG. 1, that the inclusion of a heterocyclic hydrocarbon having at least one cyclic oxygen, such as furfural, in a treatment agent with urea significantly broadens the optimum nitrogen oxides reducing curve.

EXAMPLE II

The following example illustrates the ability of treatment agents which comprise a heterocyclic hydrocarbon having at least one cyclic oxygen to reduce $NO_x$ concentrations in an effluent without producing a substantial amount of other pollutants, such as ammonia and carbon monoxide. The procedure is similar to that of Example I, except that the treatment agent injected is an aqueous solution comprising 10% by weight of urea, 0.1% by weight of a commercially available surfactant and furfural at the concentrations shown in Table 2. The fuel supply rate is 9.6 lbs/hr. and the excess oxygen is 3.0%. The results of each run are set out in Table 2.

TABLE 2

| % Furfural | Temp. °F. | NSR | $NO_x$ (ppm) Baseline | Final | % Red. | $NH_3$ (ppm) | CO (ppm) |
|---|---|---|---|---|---|---|---|
| 5 | 1575 | 2.39 | 168 | 70 | 58.3 | 61 | 125 |
| 10 | 1580 | 2.26 | 168 | 65 | 61.3 | 32 | 79 |
| 15 | 1570 | 2.14 | 168 | 77 | 54.2 | 12.5 | 25 |
| 5 | 1695 | 2.37 | 169 | 57 | 66.3 | 32 | 16 |

It is clear from Table 2 that substantial reductions in nitrogen oxides concentrations can be elicited while avoiding substantial production of other pollutants by use of the treatment agent of this invention.

EXAMPLE III

Figure 2:
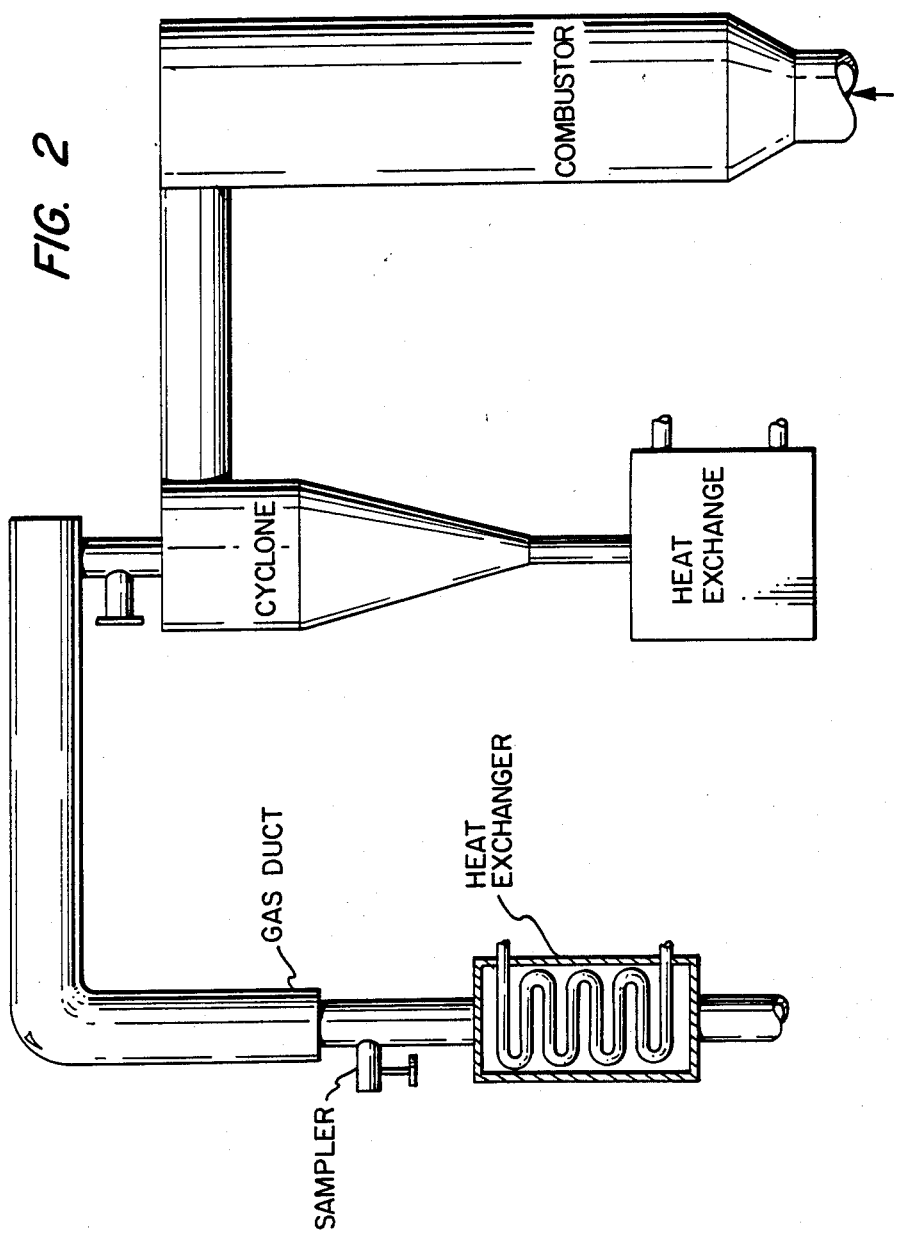
FIG. 2 is a schematic representation of a circulating fluidized bed boiler used to perform Example III.

The boiler used is a circulating fluidized bed boiler having a configuration substantially as schematically illustrated in FIG. 2. The boiler has a heat input of 1.2 mbtu/hr., firing bituminous coal. The effluent temperature is measured using a K-type thermocouple at the point of injection, which is at a location at the top of the cyclone. Atomizing injectors described in copending U.S. patent application entitled "Process and Apparatus for Reducing the Concentration of Pollutants in an Effluent" having Ser. No. 009,696, filed in the name of Burton on Feb. 2, 1987, the disclosure of which is incorporated herein by reference, are positioned at the injection point on top of the cyclone to inject the treatment agents into the effluent. The boiler also has flue gas monitors inserted in a sampler located between the gas duct and the heat exchangers to measure the concentration of compositions such as nitrogen oxides, sulfur oxides, ammonia, carbon monoxide, carbon dioxide, percent excess oxygen and other compounds of interest which may be present in the effluent.

A baseline nitrogen oxides concentration reading is taken prior to beginning each run to calculate the injection ratio of treatment agent to baseline nitrogen oxides and the NSR, and a final nitrogen oxides reading is taken during and downstream from injection of the treatment agents to calculate the reduction in the nitrogen oxides concentration in the effluent elicited by each of the treatment agents injected. All nitrogen oxides level are corrected to 3.0% oxygen.

The following runs are made:

1. An aqueous solution comprising 25% by weight of urea, 10% by weight of furfural and 0.1% by weight of a commercially available surfactant is injected into the effluent at an effluent temperature of 1596° F. and an excess of oxygen of 7.0%. The rate of injection is 11.0 ml/min. to provide an NSR of 1.5. The results are set out in Table 3.

2. An aqueous solution comprising 25% by weight of urea, 10% by weight of furfural and 0.1% by weight of a commercially available surfactant is injected into the effluent at an effluent temperature of 1609° F. and an excess of oxygen of 6.2%. The rate of injection is 14.4 ml/min. to provide an NSR of 2.0. The results are set out in Table 3.

3. An aqueous solution comprising 17.5% by weight of urea, 7.5% by weight of hexamethylenetetramine (disclosed as being an enhancer for urea in copending and commonly assigned U.S. patent application entitled "Reduction of Nitrogen- and Carbon-Based Pollutants", Ser. No. 906,671, filed in the name of Bowers on Sept. 10, 1986, the disclosure of which is incorporated herein by reference), 10% by weight of furfural and 0.1% by weight of a commercially available surfactant is injected into the effluent at an effluent temperature of 1512° F. and an excess of oxygen of 10.3%. The rate of injection is 12.4 ml/min. to provide an NSR of 1.9. The results are set out in Table 3.

4. An aqueous solution comprising 25% by weight of urea, 10% by weight of furfural and 0.1% by weight of a commercially available surfactant is injected into the effluent at an effluent temperature of 1596° F. and an excess of oxygen of 3.1%. The rate of injection is 7.0 ml/min. to provide an NSR of 1.9. The results are set out in Table 3.

TABLE 3

| Run | $NO_x$ (ppm) Baseline | $NO_x$ (ppm) Final | % Red. |
|---|---|---|---|
| 1 | 141 | 48 | 65.8 |
| 2 | 141 | 56 | 60.5 |
| 3 | 153 | 59 | 61.4 |
| 4 | 76 | 27 | 64.6 |

It is clear from Table 3 that the inclusion of a heterocyclic hydrocarbon having at least one cyclic oxygen, such as furfural, in a treatment agent with urea elicits significant nitrogen oxides reductions, even in an effluent having extremely high excess oxygen.

The above description is for the purpose of teaching the person of ordinary skill in the art how to practice the present invention, and it is not intended to detail all of those obvious modifications and variations of it which will become apparent to the skilled worker upon reading the description. It is intended, however, that all such obvious modifications and variations be included within the scope of the present invention which is defined by the following claims.

We claim:

1. A process for the reduction of the concentration of nitrogen oxides in the effluent from the combustion of a carbonaceous fuel, the process comprising injecting a treatment agent which comprises furfural into the effluent under conditions effective to reduce the concentration of nitrogen oxides in the effluent.

2. The process of claim 1 wherein said treatment agent further comprises urea.

3. The process of claim 1 wherein the temperature of the effluent is greater than about 1300° F.

4. The process of claim 3 wherein the temperature of the effluent is greater than about 1450° F.

5. The process of claim 1 wherein the temperature of the effluent is below about 2000° F.

6. The process of claim 3 wherein said treatment agent is injected into the effluent at a molar ratio of the nitrogen contained in said treatment agent to the baseline nitrogen oxides level of 1:5 to about 10:1.

7. The process of claim 6 wherein the molar ratio of treatment agent nitrogen to the baseline nitrogen oxides level is about 1:3 to about 5:1.

8. The process of claim 1 wherein said treatment agent is in solution, in a mixture or in a dispersion.

9. The process of claim 8 wherein the solvent used in said solution, mixture or dispersion comprises water.

10. The process of claim 9 wherein urea is present in said solution, mixture or dispersion in an amount of about 2% to about 60% by weight.

11. The process of claim 10 wherein furfural is present in said solution, mixture or dispersion in an amount of about 0.5% to about 25% by weight.

12. The process of claim 1 wherein the effluent is comprises an excess of oxygen.

13. The process of claim 12 wherein said effluent has an excess of oxygen of no greater than about 12% by volume.

14. The process of claim 13 wherein said excess of oxygen in the effluent is about 1% to about 6% by volume.

15. A process for the reduction of the concentration of nitrogen oxides in the oxygen rich effluent from the combustion of a carbonaceous fuel, the process comprising injecting a treatment agent which comprises urea and furfural into an effluent having a temperature of greater than about 1300° F. under conditions effective to reduce the concentration of nitrogen oxides in the effluent.

16. The process of claim 15 wherein the effluent is at a temperature of greater than about 1450° F.

17. The process of claim 15 wherein the temperature of the effluent is below about 2000° F.

18. The process of claim 15 wherein said treatment agent is in solution, in a mixture or in a dispersion.

19. The process of claim 18 wherein the solvent used in said solution, mixture or dispersion comprises water.

20. The process of claim 19 wherein urea is present in said solution, mixture or dispersion in an amount of about 2% to about 60% by weight.

21. The process of claim 20 wherein furfural is present in said solution, mixture or dispersion in an amount of about 0.5% to about 25% by weight.

22. The process of claim 15 wherein said treatment agent is injected into the effluent at a molar ratio of the nitrogen contained in said treatment agent to the baseline nitrogen oxides level of about 1:5 to about 10:1.

23. The process of claim 22 wherein the molar ratio of treatment agent nitrogen to baseline nitrogen oxides level is about 1:3 to about 5:1.

24. The process of claim 15 wherein said effluent has an excess of oxygen of no greater than about 12% by volume.

25. A process for the reduction of the concentration of nitrogen oxides in the oxygen-rich effluent from the combustion of a carbonaceous fuel, the process comprising injecting a treatment agent which comprises an aqueous solution, mixture or dispersion of about 2% to about 60% urea by weight and about 0.5% to about 25% furfural by weight into an effluent having an excess of oxygen of about 1% to about 6% by volume and a temperature of about 1450° F. to about 1900° F. in an amount sufficient to provide a molar ratio of the nitrogen contained in said treatment agent to the baseline nitrogen oxides level of about 1:3 to about 5:1, under conditions effective to reduce the nitrogen oxides level in the effluent.

* * * * *